Sept. 14, 1954         W. V. DOYLE         2,688,991
MAGNETIC ATTACHMENT FOR SCREW DRIVERS AND THE LIKE
Filed Oct. 21, 1949         2 Sheets-Sheet 1
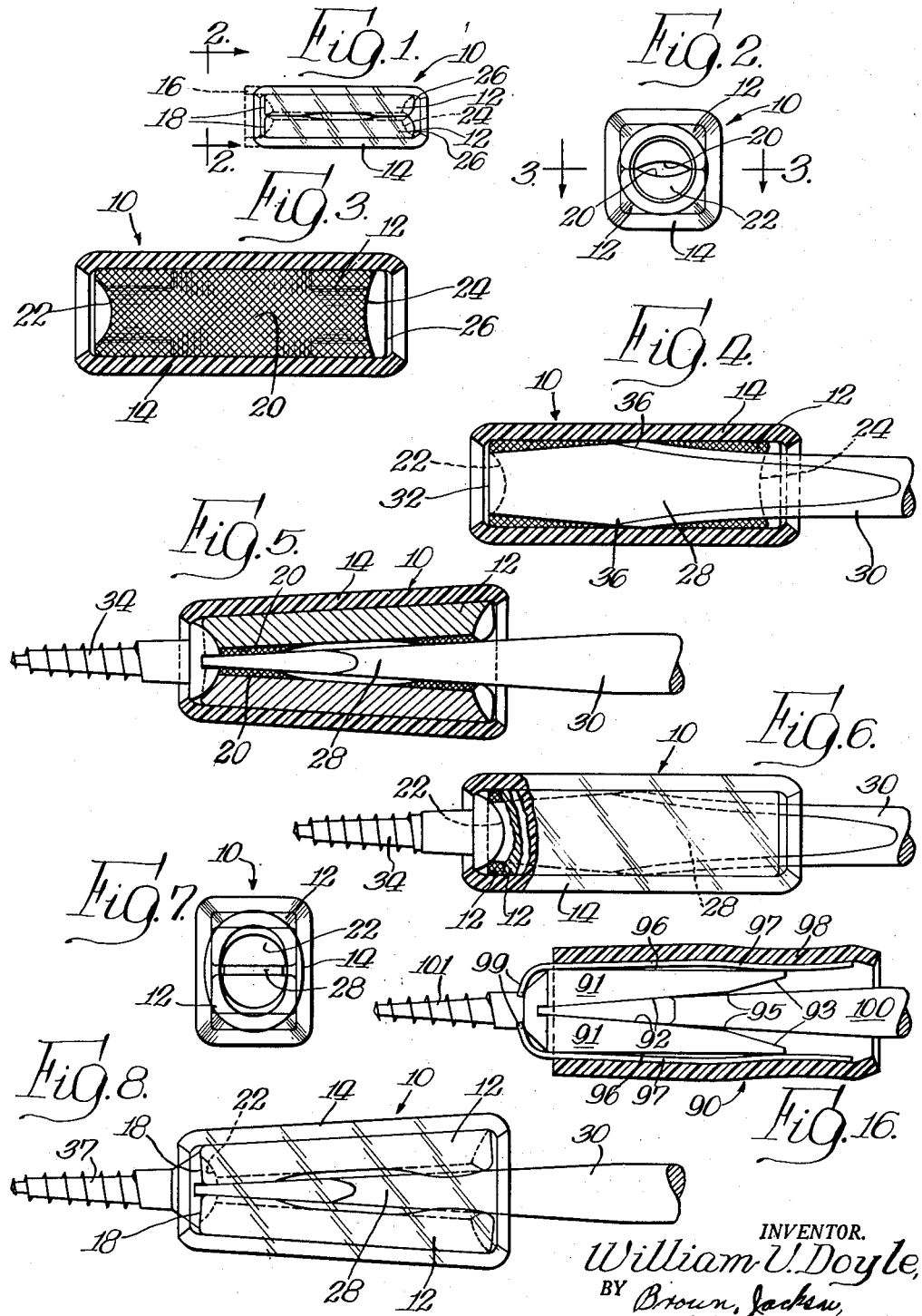
INVENTOR.
William V. Doyle,
BY Brown, Jackson,
Boettcher & Dienner
Atty's Sept. 14, 1954 W. V. DOYLE 2,688,991
MAGNETIC ATTACHMENT FOR SCREW DRIVERS AND THE LIKE
Filed Oct. 21, 1949 2 Sheets-Sheet 2
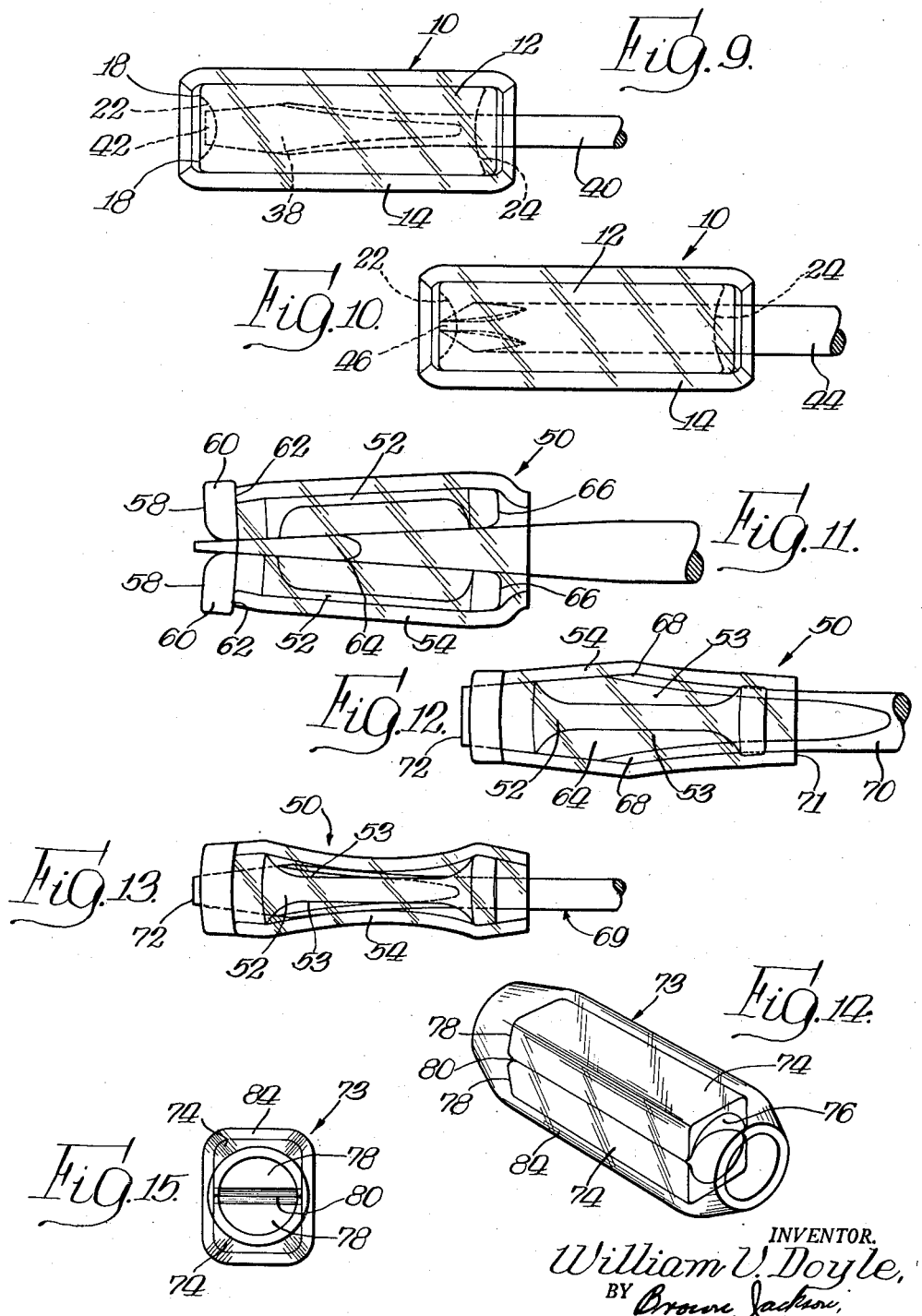
INVENTOR.
William V. Doyle,
BY
Atty's Patented Sept. 14, 1954

2,688,991

UNITED STATES PATENT OFFICE 2,688,991

MAGNETIC ATTACHMENT FOR SCREW DRIVERS AND THE LIKE

William V. Doyle, Chicago, Ill.

Application October 21, 1949, Serial No. 122,743

13 Claims. (Cl. 145—50)

My invention comprises a device formed of a plurality of magnetic members, such as permanent magnets, which are adapted to be removably attached to a shaft of a tool or other object. As such attachment, it may serve to provide a magnet with a handle, shaft, or the like, for convenient use of the magnet in locations difficult to reach by holding a magnet in the hand. It also is adapted to serve as an attachment for tools such as screw drivers in order to cooperate with the screw driver blade and shaft in holding a screw in place on the end of the screw driver blade so that the screw need not be held by hand.

While the invention is illustrated as an attachment for screw drivers, it will be readily apparent from the following description and drawings that the attachment might be formed of other dimensions for attachment to other tools wherever a magnet may be usefully employed.

It is an object of the invention to provide an attachment composed of several pieces, all of which are secured together conveniently for ready attachment to or removal from a shaft, or the like, so that the attachment may be usable with one tool and then another.

It is another object of the invention that the attachment be selectively shiftable with respect to the shaft, or the like, with which it is associated, but which will retain itself in place at any selected position.

It is a further object of the invention to provide a magnetic attachment for screw drivers, which attachment will accommodate screw drivers of various sizes, including the so-called "Phillips" screw driver, in addition to the usual type.

It is a further object to provide a removable magnetic attachment for screw drivers which is adapted to accommodate flat-headed or round-headed screws of different dimensions.

Other objects, uses and advantages of the invention will become apparent from a consideration of the following description, when taken with the drawings in which:

Figure 1 shows the magnetic attachment of my invention in side elevation in one of the actual sizes in which it may be formed;

Figure 2 is an enlarged view showing an end elevation looking in the direction of the arrows 2—2 of Figure 1;

Figure 3 is a sectional view on the line 3—3 of Figure 2 looking in the direction of the arrows;

Figure 4 is a view similar to Figure 3, but showing a screw driver blade and shaft with which the attachment has been associated;

Figure 5 is a longitudinal, vertical, sectional view of the device of Figure 1, on enlarged scale, showing the attachment connected with a screw driver blade and shaft and with a screw held in position for driving;

Figure 6 is a top plan view, on enlarged scale, of the attachment of Figure 1, showing the attachment associated with a screw driver blade and shaft and with a screw in place for driving, portions being broken away to show the interior structure;

Figure 7 is an end elevation of the attachment of Figure 6 but with the screw removed;

Figure 8 is a side elevational view of the attachment shown in Figures 1 through 7 associated with a screw driver blade and shaft, holding a flat-headed screw in position for driving;

Figure 9 is a top plan view of the attachment of Figures 1 through 8 showing it associated with a smaller screw driver blade and shaft;

Figure 10 is a top plan view of the attachment of Figures 1 through 8 showing the attachment associated with a "Phillips" type of screw driver;

Figure 11 shows a modified form of attachment associated with a screw driver blade and shaft;

Figure 12 is a top plan view of the attachment of Figure 11;

Figure 13 is a top plan view similar to Figure 12 but showing the attachment associated with a smaller screw driver blade and shaft;

Figure 14 shows a modification of the magnetic attachment of my invention;

Figure 15 is an elevation of the device illustrated in Figure 14 looking toward the left end of said device; and Figure 16 is a side elevation, with the sleeve in section, showing another modification.

Referring first to Figures 1, 2 and 3 of the drawings, there will be seen the magnetic attachment, indicated generally by the reference numeral 10. The attachment 10 comprises a plurality, preferably, a pair, of magnetic members 12, each of which is a permanent magnet. The members 12 are in contact with each other with their opposite poles adjacent each other so that they hold together by their inherent magnetism. The members 12 are embraced by a resilient sleeve, preferably of a transparent resilient material, 14. Preferably, the cross section, or diameter, of the sleeve 14 is slightly smaller than the cross section, or diameter, of the combined magnetic members 12 so that the sleeve serves to hold them resiliently against each other in addition to their magnetic attraction for each other. Sleeve 14 may be stretched a substantial amount from the position shown in Figure 1, as will be seen from the other drawings and the further description hereinafter, and will immediately resume its original shape when the stress is removed. The term "resilient," therefore, embraces the concept of elasticity. Accordingly, a rubber sleeve could be employed in place of the transparent, elastic (resilient) sleeve 14 but is less desirable in not affording a view of the interior of the device.

The cross section, or diameter, of the sleeve might be such that it is substantially the same as that of the combined members 12. In that event, the ends of the sleeve would tend to take the shape illustrated at 16 in dotted lines at the left side of Figure 1, wherein the ends of the sleeve extend straight outwardly from the end walls 18 of the magnetic members 12. However, when the cross section of the sleeve or its diameter is smaller than the cross section or diameter of the combined members 12, the overhanging ends of the sleeve 14 will turn inwardly toward the central axis of the plurality of members 12. The advantage of such inward turning will be apparent from further description hereinafter.

As may be seen from Figures 1 and 2, the opposed surfaces 20 of the magnetic members 12 are arcuately recessed and roughened along their longitudinal axes to provide a shallow longitudinally extending tunnel between them. Additionally, the opposed surfaces 20 are recessed to provide a laterally extending shallow tunnel between them, the longitudinal and lateral tunnels being substantially at right angles and intersecting at the mid-portions of the magnetic members 12.

As may be better seen from Figures 1 and 2, the end walls 18 of the magnetic members 12 together are so recessed as to provide a single recess 22 having a surface which is curved, preferably a surface forming a portion of a surface of a sphere, which recess is well adapted to accommodate round-headed screws. The end walls 18 about the periphery of the spherical recess 22 are flat and are adapted to form a seat for flat-headed screws of larger diameter than the diameter of the recess 22. It will be appreciated, however, that flat-headed screws are also adapted to seat within the spherical recess 22. Recessing the end walls of the magnetic members 12 thereby serves also to form magnetic poles of smaller cross sectional area and to space them somewhat apart and therefore increases the attractive power for screws which are made of material which may be magnetized.

At the right-hand end of the attachment, as viewed in Figure 1, there is another recess 24 having a curved surface, preferably in the nature of a portion of a surface of a sphere, provided in the adjacent end walls 26 of the magnetic members 12. The diameter of the recess is larger and the radius of curvature is greater to accommodate screw heads of greater size.

Referring now to Figures 4 through 7, the use of the attachment in connection with a screw driver blade 28 and shaft 30 can be seen. By inserting the end of the blade between the two magnetic members 12 and pushing, the entire blade may be passed between the magnetic members 12, which will thereupon be attracted to the blade, which is made of material adapted to be magnetized, and the resilient sleeve 14 will additionally serve to press the magnetic members into engagement with the blade and shaft. Since the blade is tapered, one end of the attachment will be spread apart more than the other, as may be seen from Figure 5. Since the opposed surfaces 20 of the magnetic members 12 are arcuately recessed, as shown, they will tend to engage the blade at its corners and, since the roughened surface of the opposed members is preferably roughened so as to provide shallow longitudinally extending ridges, the magnetic members will tend to grip the blade and center the magnetic members on said blade and prevent pivotal movement of the blade in a lateral direction, within the magnetic members 12 and sleeve 14. The arcuate recessing of the surfaces 20 also lends those surfaces to fitting about the rounded portion of the shaft 30 of the screw driver. As shown in Figures 4 through 8 the screw driver blade 28 is pushed through the magnetic members and sleeve until the forward end 32 of the blade 28 is substantially flush with the end walls 18. If the screw driver were inserted from the opposite end of the attachment 10, the forward end 32 of the blade would be brought out approximately flush with the ends 26 of the magnetic members 12. In such position, the blade is adapted to engage the slot of round-headed screws, such as the screw 34 of Figures 5 and 6, or the slot of flat-headed screws, which are of such diameter as to let them seat within the recess 22. If the heads of the screws are of such size that the slot is not sufficiently deep to let the screw head seat against the walls of the recess when the slot is fitted over the end 32 of blade 28, the attachment 10 may be gripped in one hand and the blade retracted a sufficient amount to permit the end 32 of the blade still to fit within the slot of the screw and yet permit the screw head to seat against the surface of the recess 22.

The lateral tunnel formed by the lateral arcuate recessing of the surfaces 20 of the magnetic members 12 serves to accommodate the widest portions 36 of the screw driver blade 28 and, when the blade is wider than the width of the magnetic members 12, the lateral tunnel permits the widest portions 36 of the blade 28 to extend outwardly beyond the sides of the magnetic members so that the inner wall of the resilient sleeve 14 is engaged. The resilient sleeve is, of course, adapted to accommodate screw drivers of considerable width. The lateral tunnel, therefore, permits screw drivers of varying sizes to be accommodated and to be better gripped than would be the case if only the longitudinally extending tunnel were provided. With only a longitudinal tunnel, there might be a tendency for the magnetic members to rock about the widest portion of a wide screw driver blade.

In Figure 8 it will be seen that a flat-headed screw 37 having a diameter greater than the diameter of the recess 22 may fit against the flat end walls 18 of the magnetic members and the screw driver will then be employed by having its forward end 32 positioned slightly forwardly of the end walls 18 of the magnetic members 12.

In Figure 9 the attachment 10 is shown associated with a screw driver having a smaller blade 38 and shaft 40 than the blade and shaft 28 and 30 of Figures 4 through 8. By reason of the arcuate recessing of the surfaces 20 of the magnetic members 12, the shallow longitudinal tunnel also fits about and grips the smaller blade 38 and shaft 40 and the ridges formed in roughening the surfaces 20 serve to prevent misalignment of the blade and shaft with respect to the longitudinal axis of the combined magnetic members 12. As shown in Figure 9, the forward end 42 of the screw driver blade 38 need be inserted only partially into the recess 22, since the smaller screw driver is adapted to cooperate with screws having smaller heads and shallower slots.

In Figure 10, a "Phillips" type of screw driver 44 is shown with the attachment 10 disposed thereon. The forward tip 46 of the screw driver may be positioned substantially flush with the end walls 18 or 26 of the magnetic members or may be positioned slightly forward or rearward from the end walls, depending upon the size of "Phillips" screws which are to be driven and the depth of their slots.

It will be noted that in each of the foregoing illustrations of the magnetic attachment 10 the resilient sleeve is shown as being longer than the magnetic members 12. It is not necessary, for satisfactory operation of the attachment 10, to have the resilient sleeve of such length, since in its place one or more annular resilient members might be employed. However, the preferred form of the invention has the resilient sleeve overhanging the end walls 18 and 26 of the magnetic members 12, since the overhanging ends will tend to turn inwardly, by reason of the midportion of the sleeve being stretched from its normal position, and thereby provide a yieldable end wall which serves to better retain the magnetic members in longitudinally aligned position. The in-turned ends of the resilient sleeve also serve another important purpose in that they provide a lateral support for the edges of screws which are held by the magnetic members 12. While the round-headed screws find lateral support in the spherical, or curved, recesses 22 or 24, flat-headed screws such as the screw 35 in Figure 8 may have a tendency to slip laterally with respect to the end 32 of the screw driver blade and the faces 18 of the magnetic members, that is, may tend to slip sideways along the end 32 of the screw driver blade. But the in-turned ends of the resilient sleeve 15 prevent such movement, or at least contain it, so that the screw does not slip off of the end walls or the end of the screw driver blade.

In the modified form of magnetic attachment, indicated generally by the reference numeral 50 in Figures 11, 12 and 13, the magnetic members 52 are recessed as at 53 intermediate their ends. Furthermore, the end walls 58 of the magnetic members 52 include oppositely directed flanges 60 which form radially extending shoulders 62. The shoulders 62 provide a stop means against which the end of the resilient sleeve 54 abuts. At the end wall 58 where the magnetic members 52 come adjacent to each other, the end walls are beveled or rounded off and directed inwardly to provide an easier entrance for the screw driver blade 64. The opposite end walls 66 are formed with a similar bevel or rounded edge to permit easy insertion of the screw driver blade from that end also. The pairs of end walls 58 and 66 may each provide a spherical recess for a round screw head similar to the recesses 22 and 24 of Figures 1 through 10.

The height of the pair of magnetic members 52 at their mid-portions is greater than their width so that the resilient sleeve 54, which normally is substantially circular, tends to position itself radially inwardly of the outside diameter of the ends of the magnetic members, as may be seen best in Figure 13. However, when a wide screw driver blade is inserted between the magnetic members 52, as shown in Figures 11 and 12, the widest portions 68 of the blade 64 extend laterally a greater distance than do the ends of the magnetic members, whereupon the resilient sleeve 54, in being pressed radially outwardly, grips the side edges of the blade 64. It will also be observed that the shaft 70 of the blade 64 may be gripped, as at 71, by the overhanging end of the resilient sleeve 54.

When a smaller screw driver 69 having a smaller blade and shaft is inserted in between the magnetic members 52, as illustrated in Figure 13, the recessed portions 53 of the magnetic members 52 permit the resilient sleeve 54 to move inwardly to grip the sides of the narrow blade. Consequently, the modification shown in Figures 11 through 13 permits the resilient sleeve to grip the side edges of the blade or shaft of a screw driver, whether it be of a small size or a large size. Normally, the screw driver will be so disposed with respect to the attachment 50 that the forward end 72 of the blade 64 will extend slightly beyond the end walls 58 of the magnetic members 52, since the end walls are substantially flat and provide, together, a single plane. It will be understood that, if desired, either end of the attachment 50 could be formed with a spherical recess.

In Figures 14 and 15 there is illustrated a modification 73 of the attachment wherein the magnetic members 74 are substantially hexahedrons in that they do not have arcuate recesses in the opposed surfaces and all of the surfaces are substantially rectangular in form. However, a recess 76 having a curved surface is provided at one end by the two magnetic members 74 while a substantially flat end is presented at the other ends 78 of the magnetic members 74, as may be best seen from Figure 15. The end walls 78 which are flat may have their adjacent edges rounded or beveled, as shown at 80, in order to permit easier insertion of the screw driver blade from that end of the attachment 73. A resilient sleeve 84 encircles the magnetic members 74 and overhangs their ends in the same manner as described above with respect to the magnetic attachments 10 and 50.

In Figure 16 there is shown a magnetic attachment, indicated generally by the reference numeral 90, wherein each of adjacent surfaces of the magnetic members 91 is formed of two surfaces 92 and 93 disposed at an angle with respect to each other, the intersection of the surfaces of each member being along a line 95. The outer surface 96 of each magnetic member 91 is preferably formed as a single plane against which a generally flat metal shaft 97 is disposed, the shafts 97 and magnetic members being embraced by a resilient sleeve 98. The shafts have corresponding ends extending from the end of sleeve 98 and directed toward each other to form a pair of jaws 99. The jaws may have their facing surfaces curved to better embrace a screw and they are preferably spaced apart a distance slightly less than the diameter of the shank of the smallest screw to be used with the screw driver, such as screw driver 100. The ends of the magnetic members 91 may be recessed so as to provide a curved seat for screws.

The jaws 99 may be spread to accommodate the shank of a screw by gripping the magnetic attachment 90 and pressing the shafts 97 by their ends which are opposite from the ends having the jaws 99. This will cause the shafts and magnetic members 91 to pivot about the lines 95 as fulcrums and the jaws 99 will be spread, as will the adjacent end of sleeve 98. Release of pressure permits the resilient sleeve 98 to urge the jaws into gripping relationship with the shank of a screw, such as screw 101. It will be appreciated that magnetic members 91 could be longer than shown but that is unnecessary, since the shafts 97 are sufficiently long to give the desired leverage for both themselves and the magnetic members 91.

Since the invention may find wide applicability, I do not intend to be limited to the illustrated preferred embodiments, insofar as the following claims are so limited, since various changes or modifications coming within the scope of the invention, as defined by the appended claims, will suggest themselves to others in the light of my disclosure.

I claim:

1. A magnetic attachment for tools having a shaft, or the like, of a material which may be magnetized, which attachment comprises a plurality of magnetized members, and an elastic sleeve surrounding said magnetized members and serving to urge the magnetized members toward each other, said members being separable and said elastic means being stretchable by inserting a shaft between the members, said members being adapted to engage the surface of the shaft by reason of their magnetism and the urging of the elastic means.

2. The attachment of claim 1 wherein the plurality of magnetized members comprises a pair of longitudinally extending members having opposed surfaces adapted to magnetically and forcibly engage opposite sides of a shaft to hold the attachment against relative rotation on the shaft, the adjacent edges of adjacent end walls of said members being beveled to permit easier insertion of a shaft between said members.

3. The attachment of claim 1 wherein the magnetized members are generally longitudinally extending and have their opposed surfaces recessed to provide a longitudinally extending shallow tunnel between them.

4. The attachment of claim 3 wherein the opposed surfaces are also recessed to provide a laterally extending shallow tunnel between them.

5. The attachment of claim 1 wherein the sleeve extends substantially the entire length of the magnetized members and longitudinally beyond one set of adjacent ends of the magnetized members and turns inwardly toward the common axis of said plurality of members.

6. The attachment of claim 1 wherein the midportions of the magnetized members are reduced in cross section to permit the sleeve to contract radially inwardly beyond the outside diameter of the ends.

7. The attachment of claim 6 wherein adjacent ends of the magnetized members provide a radially directed shoulder against which the end of the elastic sleeve is adapted to abut.

8. The attachment of claim 7 wherein the elastic sleeve overhangs the opposite set of adjacent ends of the magnetized members and turns inwardly toward the common axis of said plurality of members.

9. A magnetic attachment for tools having a shaft, or the like, of a material which may be magnetized, which attachment comprises a pair of longitudinally extending magnetized members adapted to be in contact with each other with their opposite poles adjacent each other, the adjacent edges of the end walls of said members being beveled to permit easier insertion of a shaft between said members and the opposed surfaces of said members being arcuately recessed to provide a longitudinally extending shallow tunnel between them, said opposed surfaces also being recessed to provide a laterally extending shallow tunnel between them, said opposed surfaces being roughened and providing shallow longitudinally extending ridges, one set of adjacent end surfaces of the pair of magnetized members together providing a spherical recess, and an elastic sleeve embracing the magnetized members and urging them toward each other, said sleeve extending longitudinally beyond one pair of ends of the magnetized members and turning inwardly toward the common axis of said pair of members.

10. The attachment of claim 1 together with a pair of jaws disposed forward of one end of the magnetized members, said jaws having shafts disposed between the magnetized members and the elastic sleeve and being adapted to resiliently engage the shank of a screw.

11. The attachment of claim 10 wherein each of the adjacent surfaces of the magnetized members is formed of two surfaces disposed at an angle with respect to each other and defining a fulcrum at their intersection, said shafts and magnetized members being adapted to pivot about said fulcrums when the shafts are pressed together to spread the jaws.

12. A magnetic attachment for tools having a shaft, comprising a pair of magnetized members disposed in substantially parallel relation with their opposite poles adjacent each other, said members being adapted for the reception of the shaft of a tool therebetween, and elastic sleeve means embracing said members and urging the same toward the shaft.

13. A magnetic attachment for tools comprising a plurality of magnetized members disposed in substantially parallel relation with their opposite poles adjacent each other, and unitary elastic sleeve means embracing said members and at least substantially enclosing said members.

References Cited in the file of this patent

UNITED STATES PATENTS

| Number | Name | Date |
|---|---|---|
| 1,597,500 | Alexander | Aug. 24, 1926 |
| 1,764,504 | Bronk | June 17, 1930 |
| 2,300,308 | Ojalvo | Oct. 27, 1942 |
| 2,356,204 | Birdsall | Aug. 22, 1944 |
| 2,369,300 | Kehoe | Feb. 13, 1945 |
| 2,438,231 | Schultz | Mar. 23, 1948 |
| 2,482,348 | Land | Sept. 20, 1949 |